Sept. 7, 1926.　　　　E. L. JOHNSON ET AL　　　　1,599,016
COUPLING FOR BRACELETS
Filed May 20, 1926
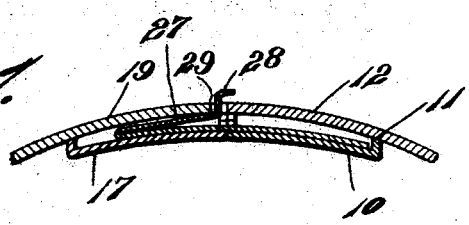
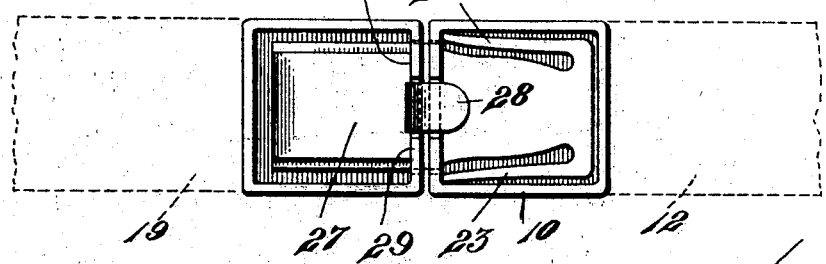
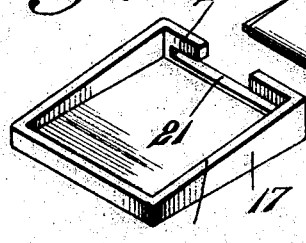
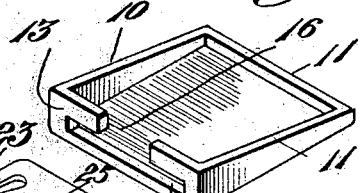
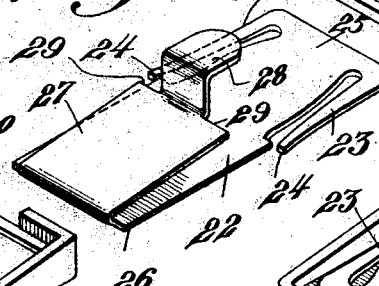
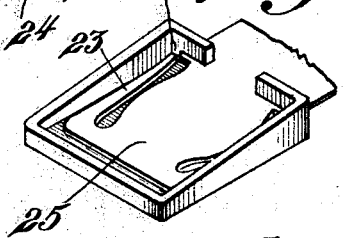
Inventors.
Emil L. Johnson.
Olof Lundsten.
BY
ATTORNEYS.

Patented Sept. 7, 1926.

1,599,016

UNITED STATES PATENT OFFICE.

EMIL L. JOHNSON AND OLOF LUNDSTEN, OF ATTLEBORO, MASSACHUSETTS.

COUPLING FOR BRACELETS.

Application filed May 20, 1926. Serial No. 110,366.

This invention relates to an improved construction of coupling or connector for attaching together opposite ends of a chain, bracelet, necklace, or other similar articles; and has for its object to provide a coupling of this character which comprises essentially a pair of socket members one attached to either end of the bracelet or the like and a separate catch member formed of a spring plate having laterally extending spring fingers at one end thereof to enter one of said socket members and be permanently locked therein, the opposite end portion of this catch member being folded back upon itself and having a presser member, this end being arranged to enter the other of said socket members to be releasably connected thereto.

With these and other objects in view, the invention consists of certain novel features of construction, as will be more fully described, and particularly pointed out in the appended claims.

In the accompanying drawings:

Figure 1 is a sectional side elevation showing the two socket members as attached to the under side of the opposite ends of the bracelet with the improved connector member attached thereto.

Figure 2 is a top view showing the relative position of the socket members as connected by the improved connector member.

Figure 3 is a perspective view of one of the socket members.

Figure 4 is a perspective view of the other one of the socket members.

Figure 5 is a perspective view of the connector member ready to be inserted into its respective socket members.

Figure 6 is a perspective view showing one end of the connector member as having been passed through the slot in its end wall and having been permanently connected to its socket member.

It is found in the practical construction and operation of couplings for bracelets, and the like, of advantage to provide a spring catch member in which the ends of the bracelet or the like may be releasably connected together. And it is also found of advantage to permanently connect this spring catch member to one end of the bracelet without the application of soldering heat thereto, which heat would serve to remove the temper from the plate; and to accomplish this and to also detachably connect the catch member to the opposite end of the bracelet requirements in a simple and effective way, we have provided a separate socket member having an edge portion adapted to be connected to the underside of the bracelet by solder.

The socket member is provided with a slotted end wall and one end of the catch member is provided with spring fingers adapted to be snapped through this slot to engage the inner face of this wall and so permanently secure this end of the member therein, the opposite end of the catch member being somewhat in the usual form to be releasably connected to another socket which may be similarly attached by solder or otherwise to the opposite end of the bracelet, by which construction it will be seen that the soldering heat is applied to the socket member for connecting them in position, before the spring catch member is connected thereto; and the following is a detailed description of the present embodiment of the invention and showing one construction of coupling by which these advantageous results may be obtained:

With reference to the drawings, 10 designates one of the socket members which is herein shown as being in open box form, the edges 11 of the box being adapted to be soldered against the under side of the end of the band bracelet 12, or other similar device, which serves to close this portion of the box.

The end wall 13 of this socket member is slotted as at 14, the slot being of a length less than that of this wall thereby leaving unslotted corner portions 15 therein. The slot as illustrated in Figure 3, is made in T-shape but the cutting away of the upper bar as at 16, is not essential to the operation of the device in this particular case.

The other socket member 17 is provided with a similar T-shaped slot, the second socket member being also somewhat in box shape with its edges 18 arranged to be soldered to the under side of the end portion 19 of the bracelet. The end wall 20 of this socket is slotted as at 21, forming said T-shaped slot.

The connecting catch member 22 is preferably formed from a flat strip of spring stock, one end of the member being provided with elongated arms 23 extending laterally from its opposite edges, the extremities 24 of these arms being arranged to extend laterally beyond the width of the plate at its entering end 25 so that when this end is inserted through the slot 14 of the socket 10 these arms will be compressed laterally inwardly upon being passed through the slot will spring outwardly to engage the inner face of the end wall 13 at the points 15 and as there are no means for disengaging these arms after having been snapped into place when the socket 10 is soldered in position to the underside of the bracelet, this catch member is permanently locked to its socket and can not be removed therefrom without rupturing the parts.

The opposite end 26 of this plate has a narrow portion 27 which is folded back upon the body portion of the plate and is spaced slightly from the body portion and this folded end is provided with a presser member 28 which extends out through a slot 30 in the face of the bracelet whereby when it is desired to connect the two ends of the bracelet together it is only necessary to insert this end 26 of the catch into the slot 21 of the socket member 17 when the folded member 27 will be compressed to snap up after entering the socket to engage the inner side of the end wall 20 thereof, thereby releasably connecting the opposite ends of the bracelet.

When it is desired to disconnect these ends, it is only necessary to depress the presser 28 which causes the shoulders 29 to be disengaged from the walls 20 of the socket 17 to freely slide through the slot 21 and permit separation of the bracelet ends.

This improved coupling member is very simple and practical in construction and is effective in its operation and by its use the socket members may be soldered in position on the under side of the bracelet and the catch member subsequently attached thereto without the use of a further soldering operation.

The foregoing description is directed solely towards the construction illustrated, but we desire it to be understood that we reserve the privilege of resorting to all the mechanical changes to which the device is susceptible, the invention being defined and limited only by the terms of the appended claims.

We claim:

1. A coupling for bracelets and the like, comprising a pair of socket members one attached to each end of the bracelet and a catch member formed of a spring plate having spring fingers extending laterally from its opposite edges and arranged to enter the slot of one of said socket members to engage its inner walls to be wholly inclosed and permanently locked therein, an opposite end portion being folded in spaced relation back upon itself with a presser extension member and arranged to enter the slot in the other of said socket members to be releasably connected thereto.

2. A coupling for a bracelet and the like, comprising a catch member formed of a spring plate having one end folded back in spaced relation upon itself, said folded end having a raised presser end member, the opposite end portion of said plate having laterally extending resilient locking arms, a socket member to be attached to one end of the bracelet and having a slotted end wall through which said arms are snapped to engage the inner face of said wall, to be entirely inclosed in said socket and locked therein, and a similar socket member arranged to be connected to the opposite end of the bracelet and also having a slotted end wall to receive the folded end of said catch member to temporarily retain the same, said presser member extending out of its socket to move the same to release position.

3. A coupling for a bracelet and the like, comprising a pair of catch receiving members having portions to be permanently attached to the under side of the opposite ends of a bracelet, each of said members having a slotted end wall, the slot in the wall of one being of a length less than the length of said wall, and a catch member having a spring tongue with an extending presser member at one end for releasably engaging the slot of one of said members, and a pair of laterally depressible side arms on the opposite edges adjacent the opposite end of said catch to snap into the slotted end of the other member and arranged to be wholly housed therein and to permanently secure the end of the catch therein.

In testimony whereof we affix our signatures.

EMIL L. JOHNSON.
OLOF LUNDSTEN.